United States Patent

Larson

Patent Number: 5,431,493
Date of Patent: Jul. 11, 1995

[54] STORAGE RETRIEVAL SYSTEM

[75] Inventor: Roger Larson, Scandia, Minn.

[73] Assignee: Lift & Storage Systems, Inc., White Bear Lake, Minn.

[21] Appl. No.: 161,883

[22] Filed: Dec. 3, 1993

[51] Int. Cl.⁶ .............................................. A47B 49/00
[52] U.S. Cl. ................................. 312/268; 312/307; 312/134; 211/121
[58] Field of Search ............... 312/307, 134, 268, 304; 211/105.6, 121, 122; 414/331, 679; 248/200.1, 644

[56] References Cited

U.S. PATENT DOCUMENTS

| | | | |
|---|---|---|---|
| 859,425 | 7/1907 | Batts | 312/268 |
| 1,542,817 | 6/1925 | Bernheim | 312/268 X |
| 2,513,502 | 7/1950 | Lyon | 312/304 X |
| 3,280,439 | 10/1966 | McCarthy | 403/263 X |
| 3,318,459 | 5/1967 | Schneider | 312/134 X |
| 3,961,822 | 6/1976 | Daniel | 248/200.1 X |
| 4,312,550 | 1/1982 | Jackson | 312/268 |
| 4,779,938 | 10/1988 | Johnston | 312/268 X |
| 5,011,030 | 4/1991 | Alaurent | 211/105.6 |
| 5,104,269 | 4/1992 | Llardison | 211/105.6 X |
| 5,339,968 | 8/1994 | Voelz | 211/121 |

FOREIGN PATENT DOCUMENTS

| | | | |
|---|---|---|---|
| 1341619 | 9/1962 | France | 312/268 |
| 617837 | 2/1961 | Italy | 312/268 |

OTHER PUBLICATIONS

Brochure by Garcey Corporation, Jun. 1990 Letter Dated Jul. 12, 1994 From Laff, Whitesel.

*Primary Examiner*—Kenneth J. Dorner
*Assistant Examiner*—Janet M. Wilkens
*Attorney, Agent, or Firm*—Hugh D. Jaeger

[57] ABSTRACT

A storage system for vertical and horizontal storage of hangered apparel includes first and second chains having inwardly directed pins. Rods for mounting on the pins include a first fixed end have a bore to mount on one pin and a second retractable end having a bore to mount on the second pin. An actuator tube is mounted over the second end of the rod and is affixed to the sliding retractable end by pins extending through slots in the rod. When the actuator tube is slid inwardly, the end is retracted so that the rod can be mounted first on the one pin on the fixed end and then positioned over the second pin. The actuator is then slid outwardly to mount the rod. A spring biases the retractable end outward.

3 Claims, 5 Drawing Sheets

STORAGE RETRIEVAL SYSTEM

BACKGROUND OF THE INVENTION

1. Field of the Invention

The present invention pertains to a storage retrieval system, and more particularly, pertains to an apparel storage system for apparel or other items where removable rods are conveyed vertically and horizontally about the interior of the storage system via opposing track systems.

2. Description of the Prior Art

Basic apparel storage usually has included simple devices, such as a wheeled bar assembly giving little though to compactness or vertical space usage. Often personnel would require the dangerous use of items, such as chairs, stools or stepladders to gain access to hangered apparel stored on multi-level racks, thus causing concern about the safety of carriage of often heavily loaded cloths racks downwardly from a lofty perch. Other systems provide for preselection of hangered items or for horizontal storage or movement of the hangered items.

The present invention overcomes the deficiencies of the prior art by providing an apparel storage system which has excellent ground level accessibility and which also provides for both horizontal and vertical storage and compactness of storage due to efficient vertical and horizontal space utilization.

SUMMARY OF THE PRESENT INVENTION

The general purpose of the present invention provides for efficient vertical and horizontal storage of hangered apparel, as well as for storage of empty apparel hangers which is also considered a storage problem. Removable rods already having been loaded in other storage areas are readily transported to the storage room area by means known to the art, where one or more apparel storage systems are housed for the storage of hangered garments. The loaded rods are then transferred mechanically or manually to engage opposing chain track assemblies. Once engaged between the opposing chains, the chains are then positioned by an operator first vertically and then horizontally to upper, lower or more rearward portions of the apparel systems. The present invention can also be used to store, lift, transfer or convey any other item that may be stored on racks, platforms, boxes, frameworks or the like such as tires or apparel such as jeans.

According to one embodiment of the present invention, there is provided an encompassing framework system having opposing left and right chain track systems. Removable rods in suspended engagement between the left and right chain track systems are positioned vertically or horizontally by action of a reversible motor and associated drive chains.

One significant aspect and feature of the present invention is a storage system for apparel or other items incorporating vertical and horizontal storage.

Another significant aspect and feature of the present invention is the use of opposing chain track assemblies.

An additional significant aspect and feature of the present invention is ground level access.

A further significant aspect and feature of the present invention is removable rods.

Still another significant aspect and feature of the present invention is the use of pin end receptacles secured to a continuous chain.

Yet another significant aspect and feature of the present invention is removable rods having a retractable cylindrical extension.

Yet another significant aspect and feature of the present invention is a rod end engagement mechanism having no protruding members.

Having thus described embodiments of the present invention, one object of the present invention hereof to provide an storage retrieval system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
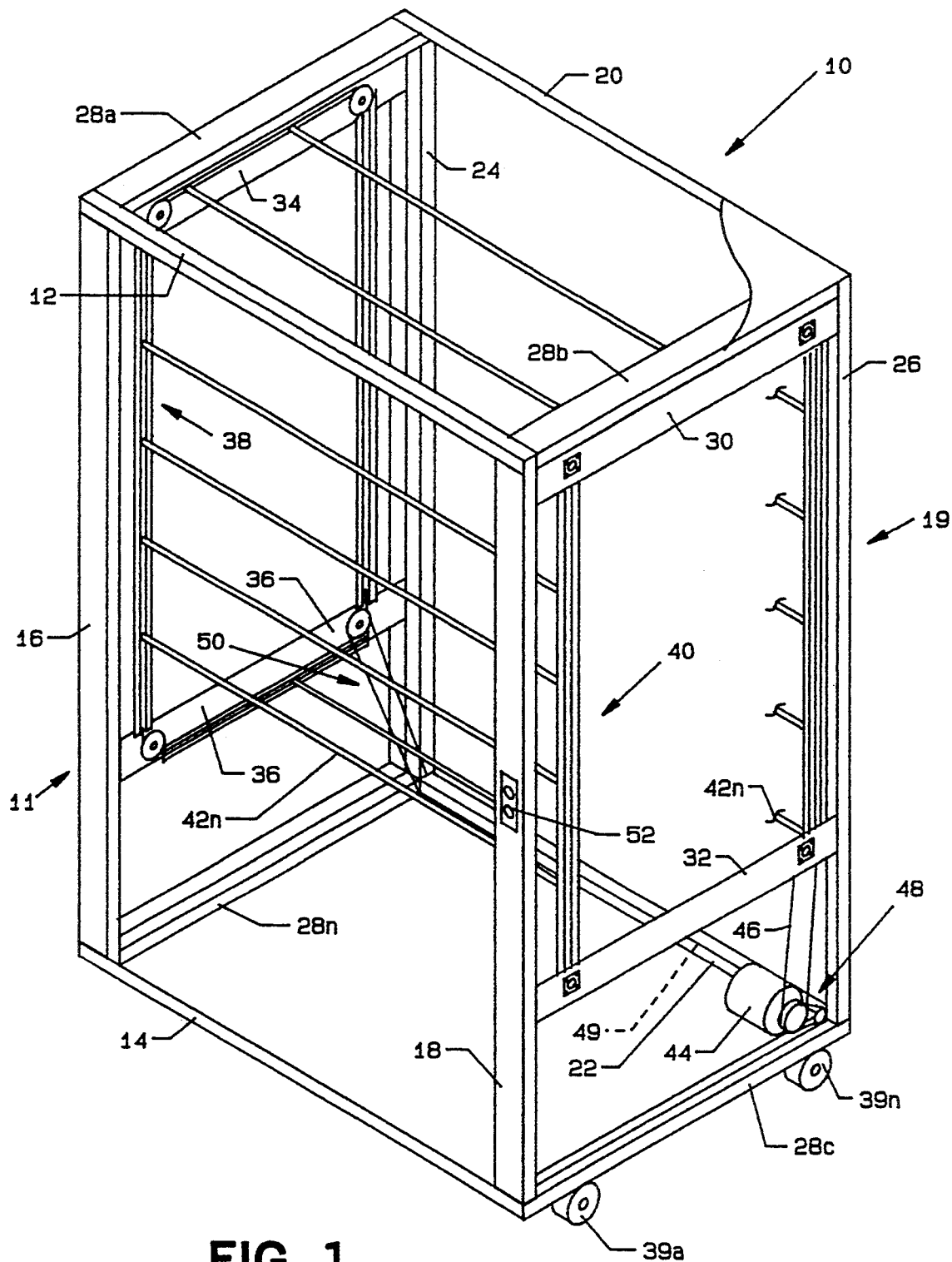
FIG. 1 illustrates a perspective view of the storage system, such as for apparel or other goods, the present invention.

FIG. 1 illustrates a perspective view of an apparel storage system 10, the present invention. The apparel storage system 10 includes a front framework 11 having a top member 12, a bottom member 14 and opposing left and right side members 16 and 18. A rear framework 19 includes a top member 20, a bottom member 22, and opposing left and right side members 24 and 26. A plurality of frame members 28a–28d connect between the front and rear frameworks 11 and 19. Also connecting between the front framework 11 and the rear framework 19 are a right upper plate 30 and a right lower plate 32. A left upper plate 34 and a left lower plate 36 also connect between the front framework 11 and the rear framework 19. Opposing like left and right chain track assemblies 38 and 40 secure between the front framework 11 and the rear framework 19 on the left upper plate 34, the left lower plate 36, the right upper plate 30 and the right lower plate 32, respectively. The right chain track assembly 40, which is similar to left chain track assembly 38 and having corresponding members throughout and within opposes the left chain track assembly 38 described in FIG. 2. A plurality of removable rods 42a–42n suspend between the left and right chain track assemblies 38 and 40. A motor 44 is secured to a bottom framework member 22 and framework member 28c to drive the left and right chain assemblies 38 and 40 via chains 46, 48 and 50. Chain 46 drives the right chain track assembly 40 directly. Chain 48 connects to a torque tube 49 in the bottom frame member 22 which subsequently drives chain 50, thus driving the left chain track assembly 38. An electrical control panel 52 operates the reversible motor 44 to position the removable rods 42a–42n secured between the left and right chain track assemblies 38 and 40. A plurality of wheels 39a–39n are also provided for easy transportation of the invention members.

Figure 2:
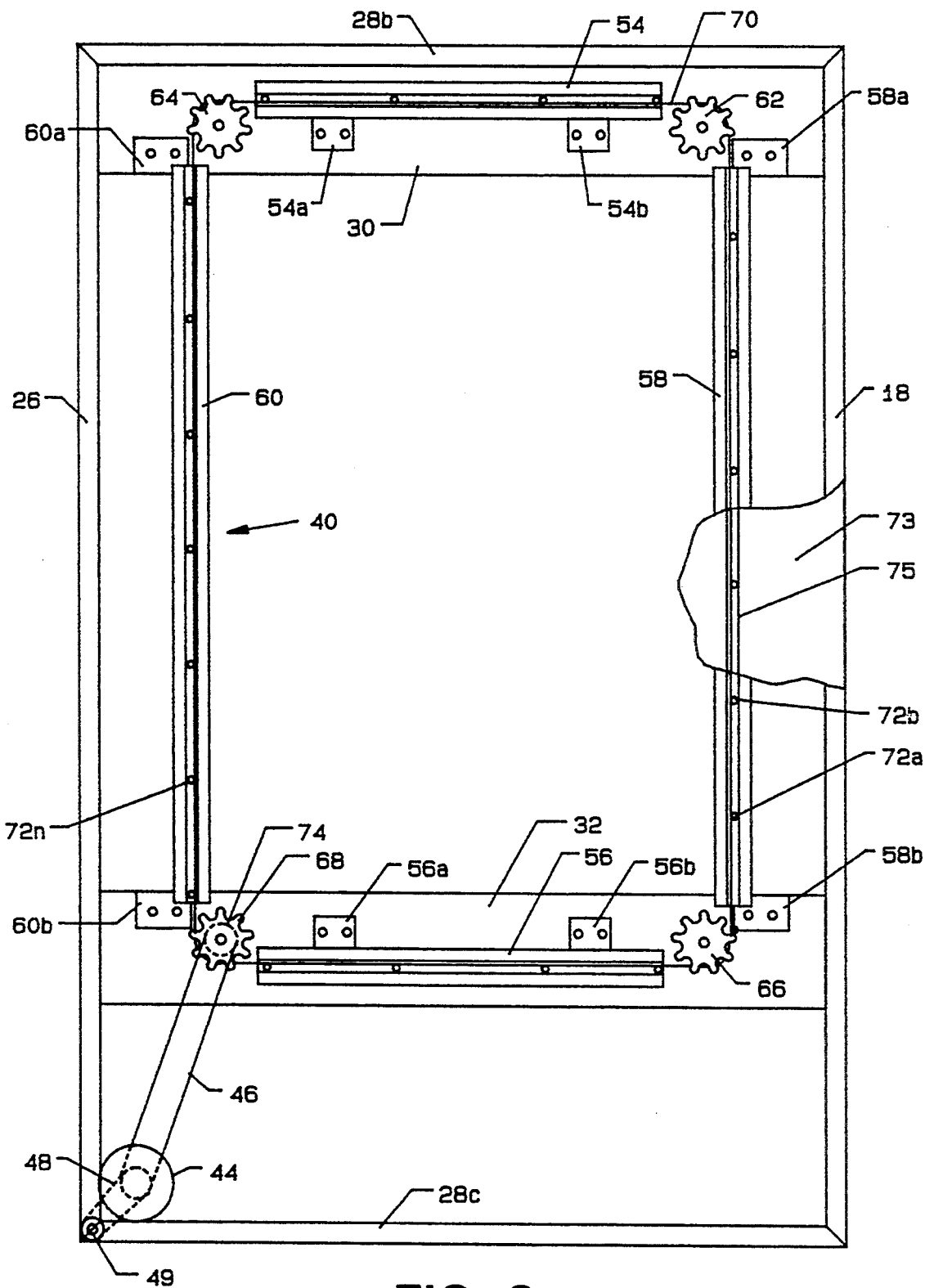
FIG. 2 illustrates a side view of the right chain track assembly.

FIG. 2 illustrates a side view of the right chain track assembly 40 from the inside of the apparel storage system 10 where all numerals correspond to those elements previously described. The left chain track assembly 38 is similar in operation, but not illustrated for purposes of brevity and clarity. Upper and lower right chain guides 54 and 56 are adjustably secured via tabs 54a, 54b and tabs 56a and 56b, respectively, to the right upper plate 30 and the right lower plate 32. A front right chain guide 58 adjustably is secured via tabs 58a and 58b between the right upper plate 30 and the right lower plate 32. A rear right chain guide 60 adjustably is secured via tabs 60a and 60b between the right upper plate 30 and the right lower plate 32. A sprocket 62 is secured to the right upper plate 30 between the ends of and aligned with one end of the upper right chain guide 54 and one end of the front right chain guide 58. Sprocket 64 is adjustably secured on the right upper plate 30 in alignment with the one end of upper right chain guide 54 and one end of the rear right chain guide 60. Sprocket 66 is secured to the right lower plate 32 in alignment with one end of the front right chain guide 58 and one end of the lower right chain guide 56. Sprocket 68 is secured to the right lower plate 32 in alignment with one end of the lower right chain guide 56 and one end of the right rear chain guide 60. A continuous chain 70 including a plurality of spaced and outwardly extending pins 72a–72n engages sprockets 62, 64, 66 and 68 and chain guides 54, 56, 58 and 60. Chain 46 drives the continuous chain 70 about sprockets 62, 64, 66 and 68 via a small sprocket 74 and connected sprocket 68. A safety face plate covering 73 is secured to the inner surfaces of the right side member 18, the right side member 26 and side members 28b and 28c to cover the majority of the members of the right chain assembly 40, and includes a continuous slot 75 through which the pins or rod mounting means 72a–72n extend.

Figure 3:
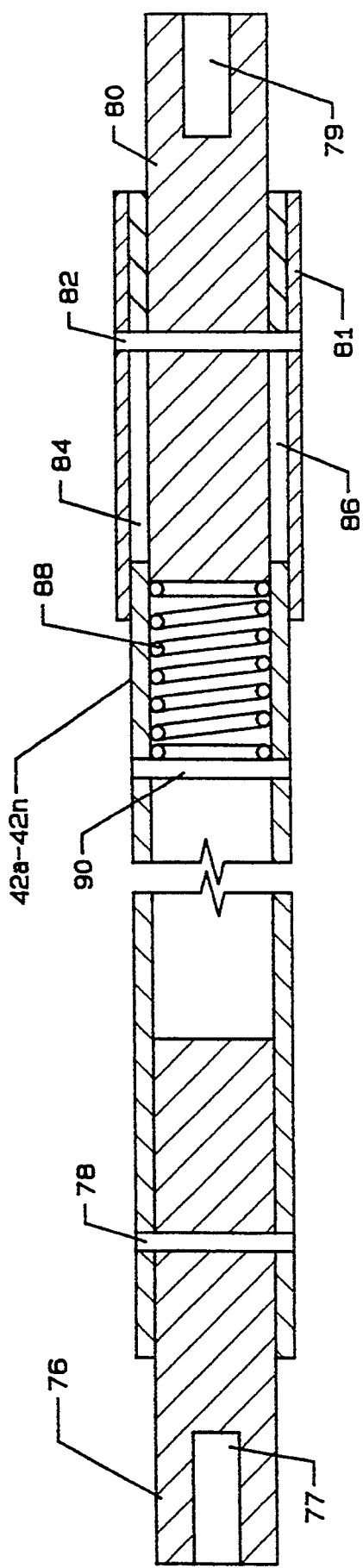
FIG. 3 illustrates a cross-sectional view of the removable rod ends.

FIG. 3 illustrates a cross-sectional view of the ends of the rods 42a–42n where all numerals correspond to those elements previously described. The rods 42a–42n are of double wall thickness to provide for sufficient strength along the length of the rods to support a heavy load placed at points along the rods. One end of the rods 42a–42n includes a fixed cylindrical extension 76 secured within the inner radius of the rods 42a–42n by a pin 78. A bore 77 is provided at the outer end of the cylindrical extension 76 to accommodate the pins 72a–72n carried by the chain 70 of FIG. 2. The opposing end of the rods 42a–42n includes a spring loaded moveable cylindrical extension 80 slidingly secured within the inner radius of the rods 42a–42n, and having a bore 79 at its outer end. An actuator slide tube 81 aligns over and about the associated end of the tubes 42a–42n. A pin or attaching means 82 is secured through the slide tube actuator 81 and the cylindrical extension 80 and aligns in opposing slots 84 and 86 which are located near the ends of the rods 42a–42n. A spring 88 aligns against a fixed pin 90 in the walls of the rods 42a–42n to cause the cylindrical extension 80 to remain extended when not actuated.

Placement of the rod between the pins 72a–72n in the left and right chain track assemblies 38 and 40 is accomplished by retracting the cylindrical extension 80 by operating the slide tube actuator 81, which retracts the end of the cylindrical extension and the bore 79, thus effectively and temporarily shortening the length of the rods 42a–42n. The cylindrical extension 76 is then placed over one of the pins 72a–72n. The slide tube actuator 81 is then released so that the bore 79 in the cylindrical extension 80 engages the opposing corresponding pins 72a–72n on the opposing chain track assembly, thus locking the rods 42a–42n between the opposing chain track assemblies 38 and 40 for subsequent movement about the opposing track assemblies 38 and 40.

Figure 4:
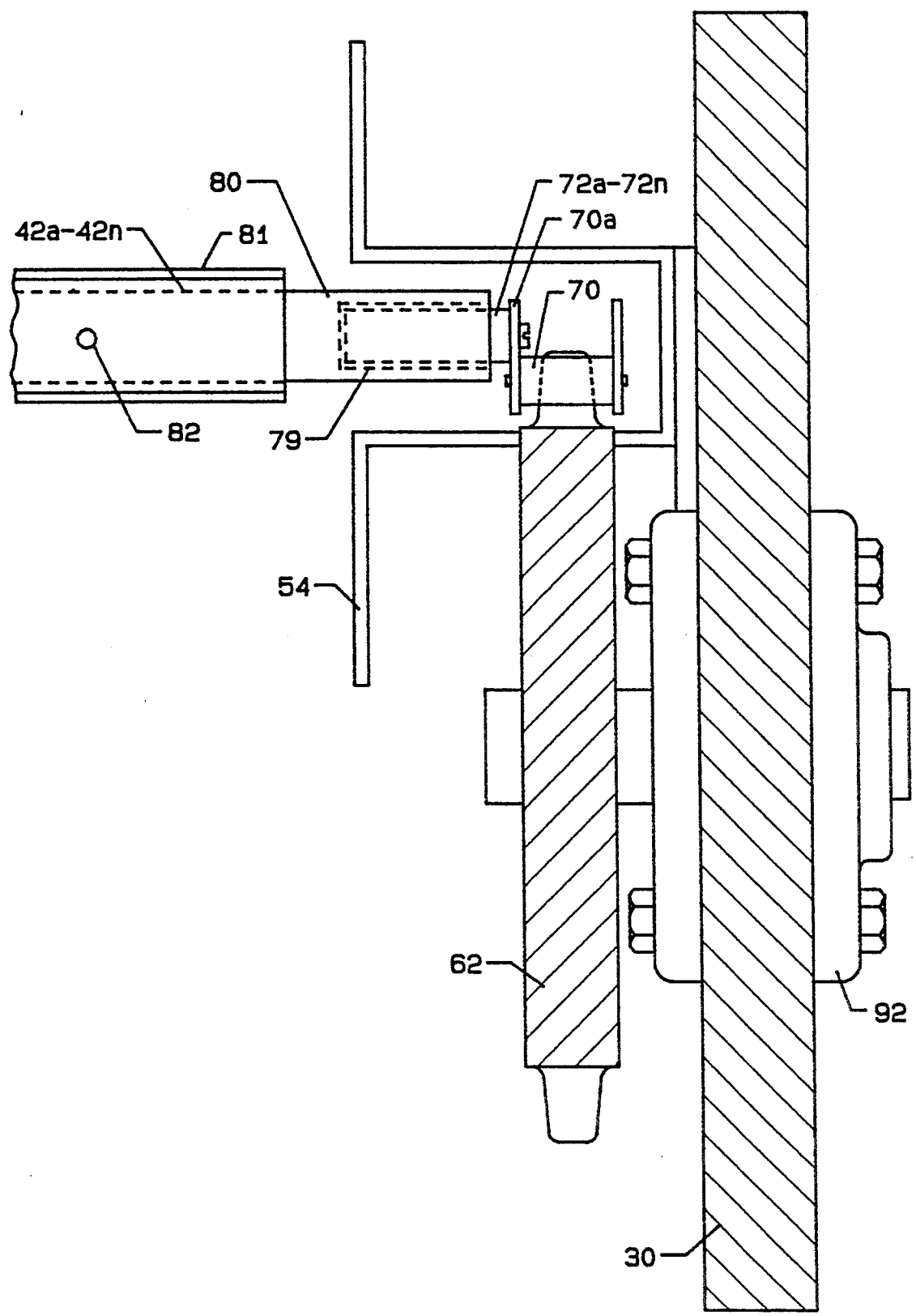
FIG. 4 illustrates the alignment of a cylindrical rod extension with a chain pin; and, FIG. 5, an alternative embodiment, illustrates a cross-sectional view of a reinforced removal rod including rod ends.

FIG. 4 illustrates alignment of a rod cylindrical extension 80 over and about pins 72a–72n where all numerals correspond to those elements previously described. Sprocket 62 is secured to the right upper plate 30 by a bearing assembly 92 as do the other sprockets. Pins 72a–72n are suitably secure to an extended link member 70a on chain 70.

Figure 5:
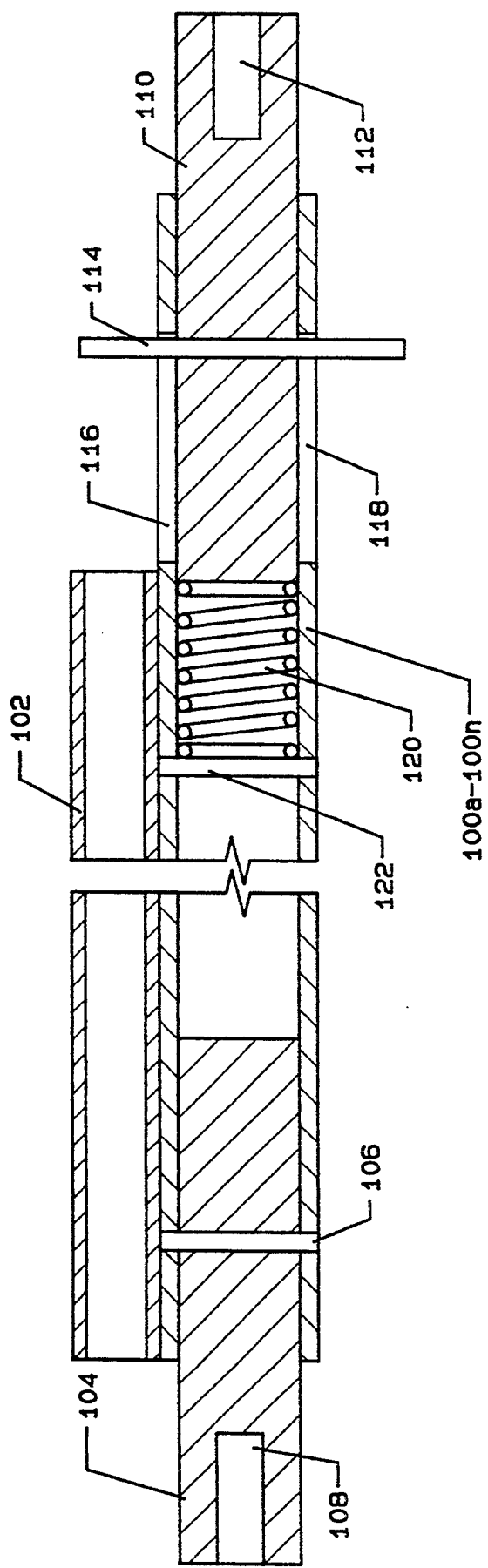

FIG. 5, an alternative embodiment, illustrates a cross-sectional view of the ends of rods 100a–100n where all numerals correspond to those elements previously described. The rods 100a–100n are of double wall thickness to provide for sufficient strength along the length of the rods to support a heavy load placed at points along the rods. Additional support is provided by suitably attaching a support member 102, such as a rectangular tubing or the like, to the rods 100a–100n for heavier than normal loads. One end of the rods 100a–100n includes a fixed cylindrical extension 104 secured within the inner radius of the rods 100a–100n by a pin 106. A bore 108 is provided at the outer end of the cylindrical extension 104 to accommodate the pins 72a–72n carried by the chain 70 of FIG. 2. The opposing end of the rods 100a–100n includes a spring loaded moveable cylindrical extension 110 slidingly secured within the inner radius of the rods 100a–100n, and having a bore 112 at its outer end. An operating pin actuator 114 is secured through the cylindrical extension 110 and aligns in opposing slots 116 and 118 which are located near the ends of the rods 100a–100n. A spring 120 aligns against a fixed pin 122 in the walls of the rods 100a–100n to cause the cylindrical extension 110 to remain extended when not actuated.

Placement of the rod between the pins 72a–72n in the left and right chain track assemblies 38 and 40 is accomplished by retracting the cylindrical extension 110 by operating the operating pin actuator 114, which retracts the end of the cylindrical extension and the bore 112, thus effectively and temporarily shortening the length of the rods 100a–100n. The cylindrical extension 104 is then placed over one of the pins 72a–72n. The slide tube actuator 114 is then released so that the bore 112 in the cylindrical extension 110 engages the opposing corresponding pin 72a–72n on the opposing chain track assembly, thus locking the rods 100a–100n between the opposing chain track assemblies 38 and 40 for subsequent movement about the opposing track assemblies 38 and 40.

MODE OF OPERATION

FIG. 1 best illustrates the mode of operation where a plurality of rods 42a–42n used for hanging of apparel, hangered either with or without apparel or other goods, are readily suspended between the left and right chain track assemblies 38 and 40 for storage within the apparel storage system 10. Actuation of the motor 44 causes the rods 42a–42n to be transported from the front framework area 11 to the upper, rear, and lower portions for storage. Chains having different pin spacings can be used to suit apparel length or the use of certain receptacles may be omitted for garments excessive lengths, such as coats or dresses. The invention may also be used to store, move, lift or otherwise convey other types of removable racks, bins, platforms and the like incorporating the features of the present invention.

Various modifications can be made to the present invention without departing from the apparent scope hereof.

We claim:
1. A storage and retrieval system comprising:
   a. a storage frame;
   b. first and second moving chains mounted on first and second ends of the frame;
   c. multiple rod mounting means mounted on the first and second chains; and,
   d. a rod for mounting on the rod mounting means including:
      (a) a rod body having first and second ends;
      (b) first extension means mounted on the first end of the rod for engaging a rod mounting means on the first chain;
      (c) second extension means mounted on the second end of the rod for engaging a second rod mounting means on the second chain, said second extension mean being a moveable extension mounted slidably within the rod body having a first inward position where the rod is short enough to fit between the first and second chains, and a second extended position wherein the second extension means will mount on the second rod mounting means of the second chain;
      (d) an actuator slide tube mounted slidably over the second end of the rod body;
      (e) first and second slots through the rod body adjacent to the second end; and,
      (f) attachment means for attaching the actuator sliding tube to the sliding second extension means, the attachment means extending through the first and second slots so that when the actuator tube is slid axially along the rod body the second extension means is moved between the first and second positions.

2. The system of claim 1, wherein the rod mounting means comprise pins mounted on the chains directed inwardly in the frame, and wherein the first and second extension means on the rod include an internal bore for mounting over the pins.

3. The system of claim 1 or 2, further comprising a spring mounted inside the rod body for biasing the second extension means to its second extended position.

* * * * *